(12) United States Patent
Kaplan et al.

(10) Patent No.: US 11,465,779 B2
(45) Date of Patent: Oct. 11, 2022

(54) PREDICTIVE MAINTENANCE SYSTEM USING AVIONICS ETHERNET NETWORKS

(71) Applicant: Rockwell Collins, Inc., Cedar Rapids, IA (US)

(72) Inventors: Daniel J. Kaplan, Melbourne Beach, FL (US); Christopher A. Hohensee, Palm Bay, FL (US); Yeshani D. Wijesekara Gamachchige, Melbourne, FL (US); Chadwick K. J. Harvey, Wilsonville, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 653 days.

(21) Appl. No.: 16/540,740

(22) Filed: Aug. 14, 2019

(65) Prior Publication Data
US 2021/0047056 A1   Feb. 18, 2021

(51) Int. Cl.
*B64F 5/60*    (2017.01)
*G06N 20/00*   (2019.01)
(Continued)

(52) U.S. Cl.
CPC ............ *B64F 5/60* (2017.01); *G06F 11/3013* (2013.01); *G06N 20/00* (2019.01); *G07C 5/0808* (2013.01);
(Continued)

(58) Field of Classification Search
CPC . B64F 5/60; G06N 20/00; G06N 3/08; G06N 3/0436; G06N 5/04; G06N 20/20;
(Continued)

(56) References Cited

U.S. PATENT DOCUMENTS

| | | | |
|---|---|---|---|
| 10,867,455 B2 * | 12/2020 | Segal | G07C 5/008 |
| 2019/0180527 A1 * | 6/2019 | Segal | G06N 20/00 |
| 2021/0065477 A1 * | 3/2021 | Segal | G07C 5/0808 |

FOREIGN PATENT DOCUMENTS

WO   2019079771 A1   4/2019

OTHER PUBLICATIONS

Amruthnath Nagdev et al: "A research study on unsupervised machine learning algorithms for early fault detection in predictive maintenance", 2018 5th International Conference on Industrial Engineering and Applications (ICIEA), IEEE, Apr. 26, 2018, pp. 355-361, XP033359255.

(Continued)

*Primary Examiner* — Sisay Yacob
(74) *Attorney, Agent, or Firm* — Suiter Swantz pc llo

(57) ABSTRACT

A predictive maintenance system is disclosed. The system includes a network of analog and digital sensors, each sensor configured for measuring telemetry data associated with temperature levels, voltage levels, current levels, and other analog or digital parameters. The system includes microprocessors for receiving the (digitized) analog and digital telemetry data, tabulating and timestamping the raw telemetry datasets. The microprocessors compress the raw data and reduce its dimensionality by generating principal component sets from the raw data based on scalar parameters corresponding to machine learning algorithms stored to memory, the principal component sets capturing a majority of variances within the raw data. The principal component sets are organized into data packets including identifiers for the relevant algorithms. The data packets are transmitted via real time networks for either onboard storage or ground-based analysis.

15 Claims, 5 Drawing Sheets

(51) Int. Cl.
    *G07C 5/08*      (2006.01)
    *H04Q 9/02*      (2006.01)
    *G06F 11/30*     (2006.01)
    *H04L 67/12*     (2022.01)

(52) U.S. Cl.
    CPC .............. *H04Q 9/02* (2013.01); *H04L 67/12* (2013.01); *H04Q 2209/10* (2013.01); *H04Q 2209/30* (2013.01)

(58) Field of Classification Search
    CPC ........ G06N 5/00; H04L 67/12; G07C 5/0808; H04Q 9/02; B64D 2045/0085; B64D 45/00
    See application file for complete search history.

(56) References Cited

OTHER PUBLICATIONS

D'Angelo Gianni et al: "Feature extraction and soft computing methods for aerospace structure defect classification", Measurement, Institute of Measurement and Control. London, GB, vol. 85, Feb. 27, 2016, pp. 192-209, XP029442422.

Extended Search Report for European Application No. 19216290.7 dated Jun. 8, 2020, 11 pages.

Zefeng Wang et al: "A novel aircraft fault diagnosis and prognosis system based on Gaussian Mixture Models", 2012 12th International Conference on Control Automation Robotics & Vision (ICARCV), IEEE, Dec. 5, 2012, pp. 1794-1799, XP032347 404.

* cited by examiner

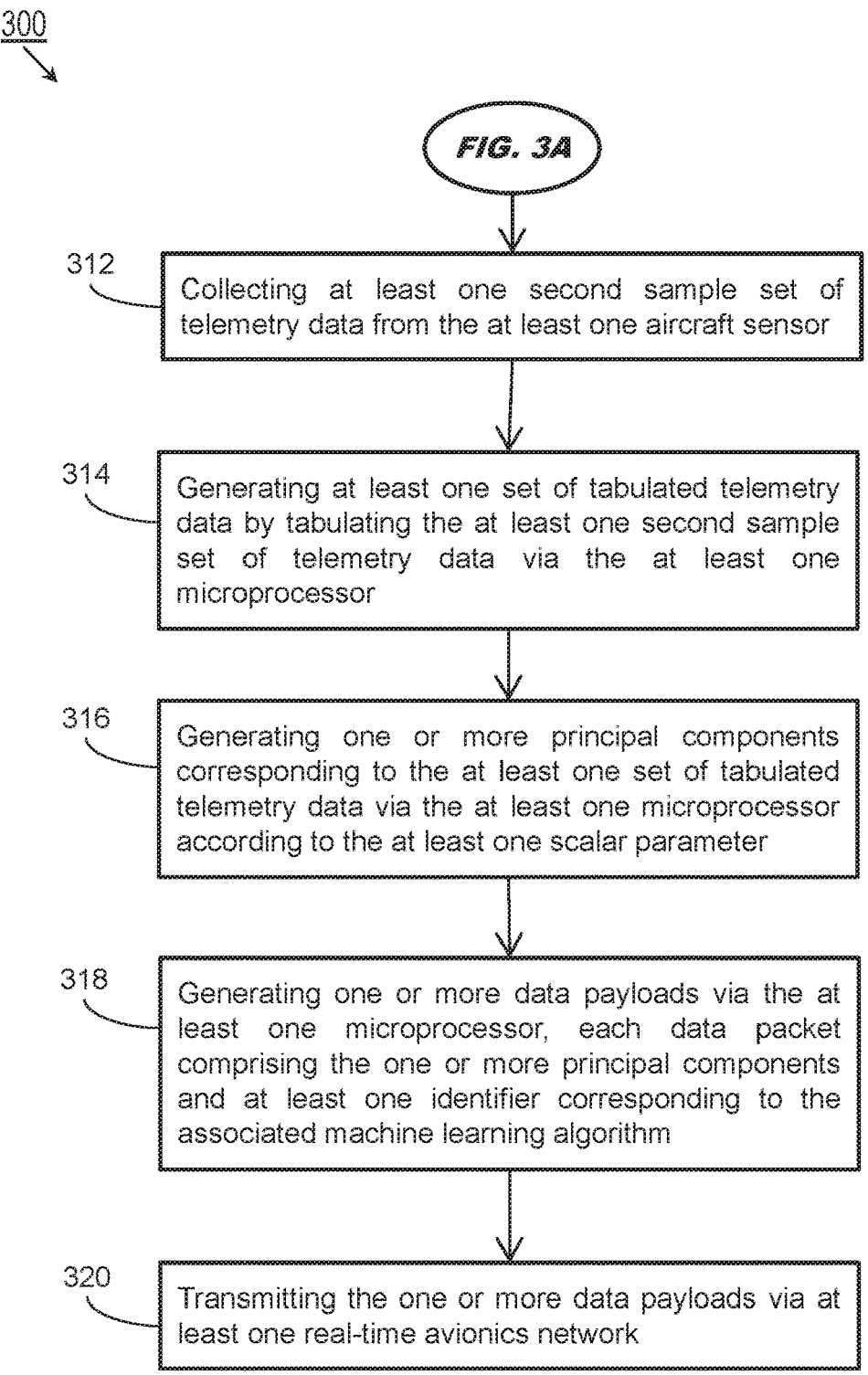

322 — Collecting, via the at least one aircraft sensor, at least one third sample set of telemetry data 324 — Determining, via the at least one microprocessor, at least one second covariance matrix associated with the third sample set of telemetry data 326 — Determining, via the at least one microprocessor, at least one second eigenvalue of the second covariance matrix, the second eigenvalue corresponding to at least one second eigenvector 328 — Selecting, via the at least one microprocessor, one or more second eigenvalues of the at least one determined second eigenvalue based on the predetermined desired variance threshold 330 — Modifying the at least one scalar parameter based on at least one second eigenvector corresponding to the one or more selected second eigenvalues

FIG. 3C

PREDICTIVE MAINTENANCE SYSTEM USING AVIONICS ETHERNET NETWORKS

BACKGROUND

Predictive maintenance is an emerging application area within the aviation industry, having the potential to reduce industry operating costs by billions of dollars annually while increasing overall reliability on an aircraft by aircraft basis. However, the effectiveness of machine learning algorithms associated with predictive maintenance depends greatly on both the quantity of installed sensors and on their sampling rates. The size of the data sets required by such machine learning algorithms precludes effective real-time transmission over avionics networks. Similarly, the data sizes required are too large for practical storage via limited-capacity onboard data concentrators. For example, often only a small subset (e.g., reflecting the final minute before a unit shutdown) of telemetry data may be recorded or transmitted for analysis.

SUMMARY

A predictive maintenance system is disclosed. In embodiments, the predictive maintenance system includes a network of sensors disposed throughout an aircraft supersystem. Each sensor (analog or digital) collects raw telemetry data associated with specific analog or digital parameters. The system is embodied in a line replaceable unit (LRU) and includes memory or data storage capable of storing machine learning algorithms designed to assess the system health of the LRU. Each algorithm has a unique identifier and several scalar parameters associated therewith. The system includes microprocessors capable of receiving the incoming raw telemetry data (either digital or digitized analog data), organizing the raw data via tabulation and timestamping. The microprocessors compress the raw data, reducing its dimensionality, by generating principal component sets based on the scalar parameters to capture the majority of variances within the raw data. The compressed datasets are converted into data payloads including the specific algorithm identifiers.

A method for predictive maintenance is also disclosed. In embodiments, the method includes collecting sample sets of raw telemetry data from a network of aircraft sensors (analog or digital). The method includes determining a covariance matrix of the raw telemetry data. The method includes determining eigenvalues of the covariance matrix. The method includes selecting a set of top eigenvalues based on a desired data variance capture level or a predetermined threshold. The method includes defining one or more scalar parameters (corresponding to a machine learning algorithm stored to memory) based on eigenvectors corresponding to the selected top eigenvalues. The method includes collecting additional telemetry datasets via the aircraft sensors. The method includes tabulating and timestamping the additional telemetry datasets. The method includes compressing the tabulated telemetry data by generating principal components based on the defined scalar parameters (and their associated machine learning algorithms). The method includes generating data payloads based on the generated principal component sets and including unique identifiers of the associated machine learning algorithms. The method includes transmitting the data payloads via real time avionics networks to onboard or ground-based destinations for storage or processing.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIGS. 3A through 3C are flow diagrams illustrating a method for predictive maintenance in accordance with example embodiments of this disclosure.

DETAILED DESCRIPTION

Figure 1:
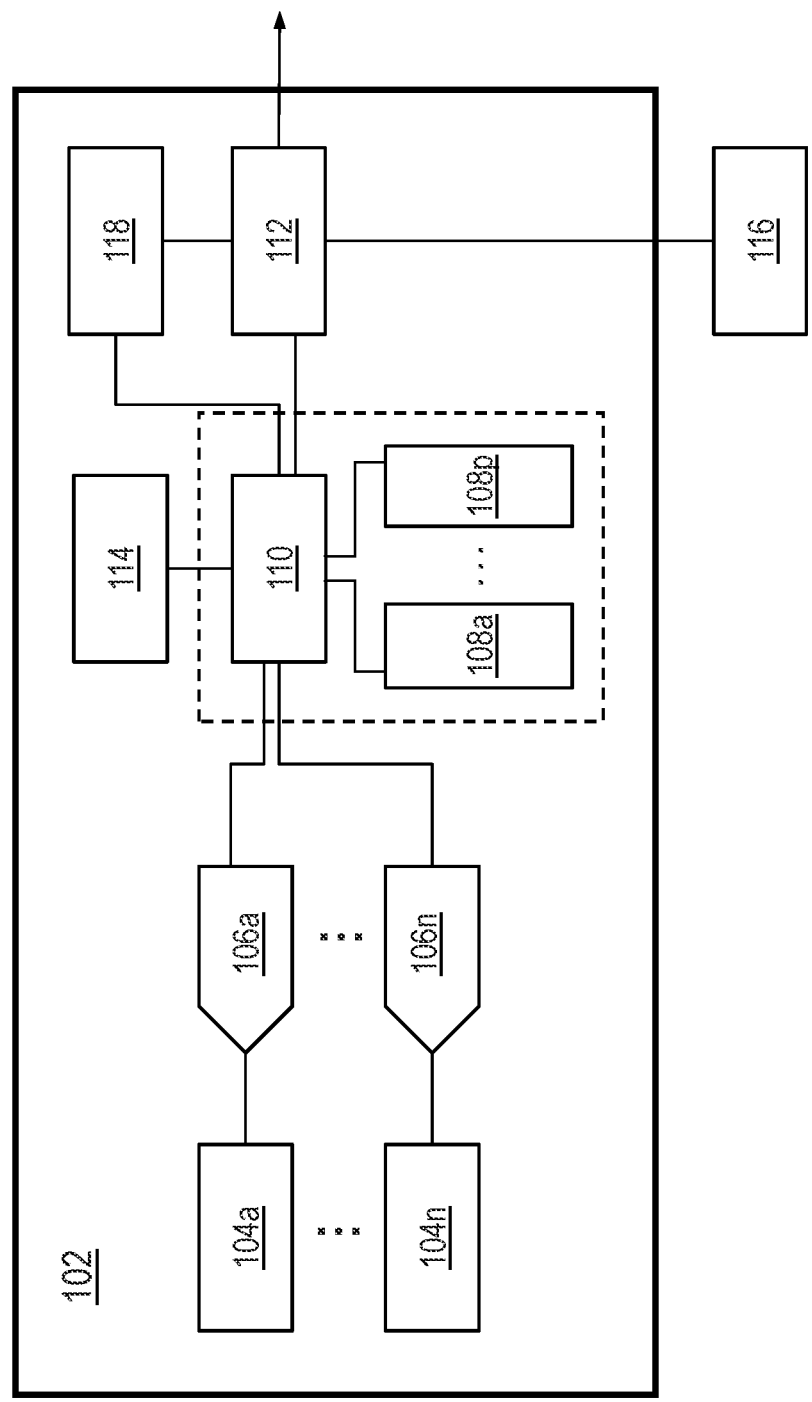
FIG. 1 is a block diagram illustrating a predictive maintenance system in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to an avionics predictive maintenance system configured to collect telemetry data in real time, compressing the telemetry data via dimensionality reduction. The compression of telemetry data circumvents hardware limitations by allowing the predictive maintenance system to transmit its most important features via real-time avionics networks, ensuring the greatest possible flow of useful information for predicting the overall health of avionics systems. Similarly, the compression of telemetry data into manageable principal components allows the predictive maintenance system to process and store higher quality predictive analytics information at a lower bandwidth and with smaller data storage requirements.

Referring to FIG. 1, a predictive maintenance system 100 is disclosed. The predictive maintenance system 100 may be embodied in a line replaceable unit 102 (LRU) installable aboard an aircraft and may include analog sensors 104a . . . 104n, analog-digital converters 106a . . . 106n, digital sensors 108a . . . 108p, microprocessors 110, and a network interface 112.

In embodiments, the predictive maintenance system 100 may monitor and measure a variety of onboard internal parameters through a network of sensors configured for collecting telemetry data associated with the internal parameters. For example, the predictive maintenance system 100 may incorporate a network of N analog sensors 104a-n, each individual analog sensor (or bank thereof) capable of tracking a particular analog parameter, e.g., a temperature level, a voltage level, a current level, an air pressure level, or any other like appropriate analog variable. The analog telemetry data measured by the analog sensors 104a-n may be passed through a network of analog-digital converters 106a-n to be digitized for use by the microprocessor 110.

In embodiments, the predictive maintenance system 100 may similarly monitor digital parameters through the network of P digital sensors 108a-p. Similarly to the analog sensors 104a-n, each digital sensor 108a-p or group thereof may monitor a particular digital parameter or group thereof, e.g., a timing parameter, a memory utilization, a processor utilization, or any like appropriate digital parameter. The digital sensors 108a-p may be in communication with the microprocessor 110 or, in some embodiments, may be integrated into the microprocessor and directly track its usage or performance parameters.

In embodiments, the microprocessor 110 (e.g., group of microprocessors, processing cores, or partitions thereof) may continually collect telemetry data in real time or near real time from the analog sensors 104a-n (via the ADCs 106a-n) and digital sensors 108a-p. The microprocessor 110 may be in communication with a memory 114 or other like data storage unit or units capable of storing machine learning algorithms particular to the analog and digital parameters monitored by the analog and digital sensors 104a-n, 108a-p. Each machine learning algorithm may be tied to one or more scalar variables designed for dimensionality reduction of the telemetry data sent to the microprocessor 110. These scalar variables, also stored in memory 114 along with their respective algorithms, may be developed in advance, e.g., simultaneously with the development of the machine learning algorithms. In some embodiments, analog and digital parameters tracked by the predictive maintenance system 100 may change over time, and the relevant scalar variables may similarly change, as discussed below.

In embodiments, the microprocessor 110 may continually compress incoming telemetry data according to principal component analysis. Principal component analysis may provide for a significant compression or dimensionality reduction of massive amounts of telemetry data, allowing for the extraction of most of the most useful data therefrom. The compressed or reduced telemetry data may be transmitted, via the network interface 112, over real-time avionics networks (e.g., networks implemented according to ARINC 664, via ARINC 429 hardware, or other similar aircraft-based networks or networks providing connectivity between the aircraft and ground-based receivers). For example, the compressed telemetry data may be transmitted to ground control facilities located remotely from the aircraft for processing and analysis. In some embodiments, the compressed telemetry data may be sent to an onboard data concentrator 116 which, e.g., "picks up" the compressed data for temporary onboard storage or subsequent transmission to a ground-based control facility. For example, a single data concentrator 116 may be in communication with, and receive compressed data from, multiple instances of the predictive maintenance system 100. In some embodiments, the LRU 102 may incorporate internal data storage (118) for the short-term or longer-term storage of compressed or reduced telemetry data (or, alternatively, store the compressed telemetry data in memory 114).

In embodiments, once received, the compressed telemetry data may be compared according to the machine learning algorithms via which they were compressed, e.g., to determine if the LRU 102 is in need of maintenance. A further advantage of telemetry data compression according to the predictive maintenance system 100 is that the privacy of the compressed data is enhanced; the compression effectively encodes the telemetry data against any potential recipient not in possession of specific machine learning algorithms via which it was compressed.

Figure 2A:
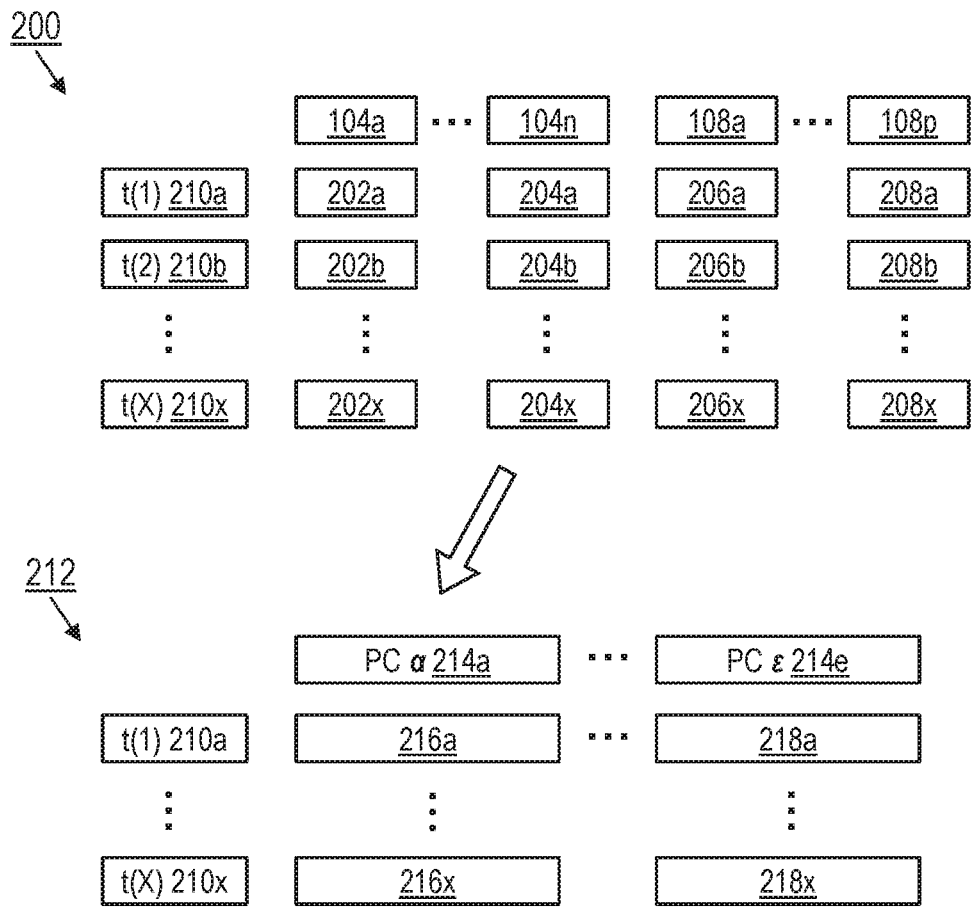
FIGS. 2A and 2B are diagrammatic illustrations of operations of the predictive maintenance system of FIG. 1.

Referring now to FIG. 2A, a tabular telemetry dataset 200 is disclosed. In embodiments, the microprocessor (110, FIG. 1) may sample sets of telemetry data collected by the analog and digital sensors 104a-n, 108a-p of the predictive maintenance system (100, FIG. 1).

For example, the output of each analog sensor 104a-n (as received via the ADCs (106a-n, FIG. 1)) may include a sequence of data elements 202a, 202b, . . . 202x; 204a, 204b, . . . 204x; representing the flow of telemetry data from each analog sensor or group thereof in real time. Similarly, the output of each digital sensor 206a, 206b, . . . 206x; 208a, 208b, . . . 208x; may represent the real-time flow of telemetry data from each digital sensor. In embodiments, the microprocessor 110 may organize incoming telemetry data by timestamping and tabulating the incoming data, generating the tabulated telemetry dataset 200. For example, the microprocessor may generate columns corresponding to each individual analog or digital sensor 104a-n, 108a-p and rows corresponding to a continual sequence of timestamps 210a, 210b, . . . 210x. Accordingly, each incoming data element 202a, 204a, 206a, 208a associated with a given timestamp 210a may be organized into a row. In some embodiments, not every timestamp 210a-x may correspond to a data element from each analog or digital sensor 104a-n, 108a-p.

In embodiments, the timestamped tabulated telemetry set 200 may be compressed, or dimensionally reduced, into a principal component set 212 according to the principles of principal component analysis or other like similar dimensionality reduction schemes. For example, according to principal component analysis, the majority of meaningful variances in a given data set, encompassing hundreds of sensed parameters, may be explained by only a handful (e.g., four or five) principal components. The principal component set 212 may incorporate a set of principal components A . . . E (214a . . . 214e) developed according to scalar parameters corresponding to one or more particular machine learning algorithms (according to which the compressed telemetry data may later be evaluated after it is transmitted and received by its network destination). The scalar parameters may be developed in advance (e.g., during program development, in conjunction with the development of the corresponding machine learning algorithms) or updated by the predictive maintenance system 100.

In embodiments, the scalar parameters may be developed based on a sample set of telemetry data (e.g., artificially generated or collected in real time by the analog and digital sensors 104a-n, 108a-p). For example, given the sample set X of N variables over a time t:

$$X = \begin{bmatrix} x_{11} & x_{12} & \ldots & x_{1N} \\ x_{21} & x_{22} & \ldots & x_{2N} \\ \ldots & \ldots & \ldots & \ldots \\ x_{t1} & x_{t2} & \ldots & x_{tN} \end{bmatrix}$$

the microprocessor 110 may center the data by subtracting the mean value from each column $x1_{(1 \ldots t)1}$, generating a centered dataset X':

$$X' = X - \text{mean}(X)$$

from which a covariance matrix $\Sigma$ of X' may be determined:

$$\sum = \begin{bmatrix} \sigma_1^2 & \sigma_{12} & \sigma_{1N} \\ - & \sigma_2^2 & \sigma_{2N} \\ - & - & \sigma_N^2 \end{bmatrix}$$

from which the eigenvalues $\lambda$ and eigenvectors v of the covariance matrix $\Sigma$ may be determined:

$$\Sigma v = \lambda v$$

and the eigenvalues $\lambda$ sorted, e.g., from largest to smallest. Based on a desired variance threshold $\alpha$, which may be predetermined, the top k eigenvalues $\lambda$ may be selected sufficient to exceed $\alpha$, capturing most of the important data variance across far fewer parameters than the original N-dimensional telemetry dataset:

$$\alpha \leq \frac{\sum_{i=1}^{k} \lambda_i}{\sum_{i=1}^{N} \lambda_i}$$

In embodiments, the matrix v of eigenvectors corresponding to the selected eigenvalues $\lambda$ may be saved to memory (114, FIG. 1) and used as a model by the predictive maintenance system 100 for compressing telemetry data. For example, the matrix v may include the scalar parameters configured for feeding the linear operations generating the principal components 214a-e.

In embodiments, the microprocessor 110 may generate the principal component set 212 by centering the tabulated telemetry dataset 200 as described above. The centered telemetry data may be projected onto the principal components 214a-e (e.g., onto the selected eigenvectors v) such that the resulting principal component set 212 has a lower dimensionality than the original tabulated telemetry dataset 200 (X''=X'v) and is smaller in size. Each principal component 214a-e may incorporate a sequence of timestamped data elements 216a . . . 216x, 218a . . . 218x corresponding to the timestamps 210a-x imposed on the original telemetry dataset 200 by the microprocessor 210 and to the analog and digital sensors 104a-n, 108a-p, e.g.:

Principal Component $\alpha$ (214a)=$\alpha_{A1}$Analog Sensor 1+ . . . +$\alpha_{AN}$Analog Sensor $N$+$\beta_{A1}$Digital Sensor 1+ . . . +$\beta_{AP}$Digital Sensor $P$

. . .

Principal Component $\epsilon$ (214e)=$\alpha_{E1}$Analog Sensor 1+ . . . +$\alpha_{EN}$Analog Sensor $N$+$\beta_{E1}$Digital Sensor 1+ . . . +$\beta_{EP}$Digital Sensor $P$.

In embodiments, the above-described process may be used by the predictive maintenance system 100 to modify or update a stored set of scalar parameters, e.g., if the underlying machine learning algorithms have been changed or updated.

Figure 2B:
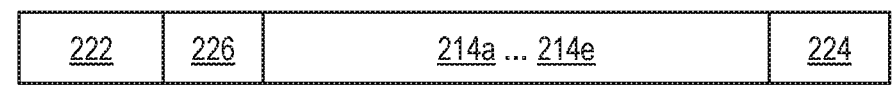

Referring also to FIG. 2B, a data payload 220 is disclosed. In embodiments, when the principal component set 212 is generated, the microprocessor 110 prepares the compressed telemetry data therein (data elements 216a-x, 218a-x) for transmission by generating the data payload 220 (e.g., data packet). The data payload 220 may be based on standard ARINC 664 frames for real-time avionics networks (or other similar frame types, depending on the network specifications) and may include frame overheads 222, 224 consistent with associated protocols (comprising, e.g., preamble data, source/destination addresses, check sequencing). The data payload 220 may include the principal components 214a-e of the principal component set 212 as well as a unique identifier 226 identifying the particular machine learning algorithms under which the principal component set 212 was generated. For example, the recipient of the data payload 220 may determine from the identifier 226 under which machine learning algorithms the principal component set 212 should be analyzed.

Figure 3A:
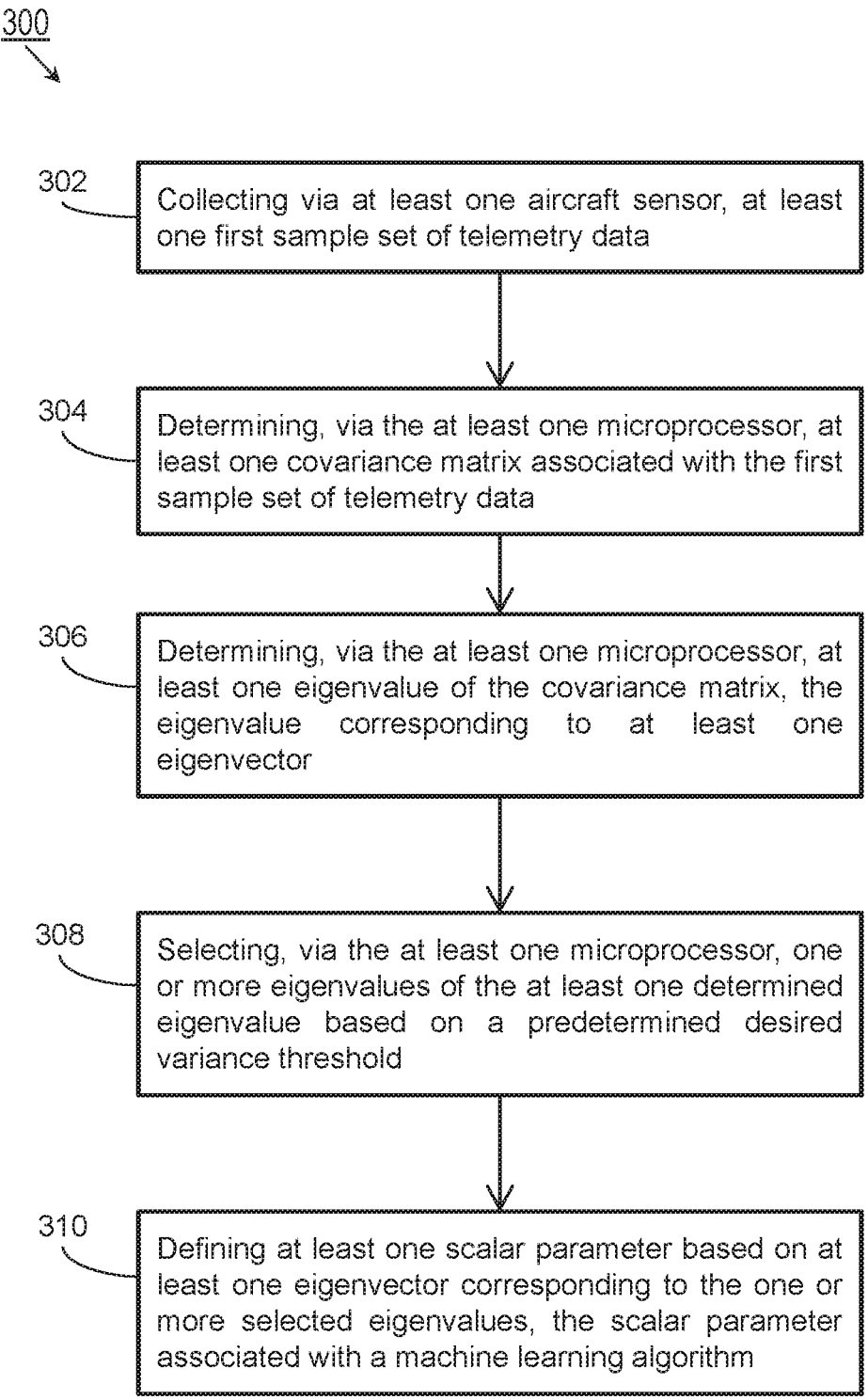

Referring to FIG. 3A, a method 300 for predictive maintenance may be implemented by the predictive maintenance system 100 and may include the following steps.

At a step 302, aircraft sensors collect a first sample set of telemetry data, e.g., based on one or more analog or digital parameters.

At a step 304, a microprocessor of the predictive maintenance system determines a covariance matrix based on the collected telemetry data. For example, the microprocessor may first center the raw telemetry data and determine a covariance matrix of the centered data.

At a step 306, the microprocessor determines eigenvalues of the covariance matrix, each eigenvalue corresponding to an eigenvector.

At a step 308, the microprocessor selects the top k eigenvalues (where k is an integer) based on a predetermined variance threshold (e.g., a desired level of data variance to be captured).

At a step 310, the microprocessor defines one or more scalar parameters based on the eigenvectors corresponding to the selected top k eigenvalues, each scalar parameter associated with a machine learning algorithm (e.g., stored to memory within the predictive maintenance system).

Referring in particular to FIG. 3B, the method 300 may include the additional steps 312 through 320. At the step 312, the aircraft sensors collect one or more additional sample sets of raw telemetry data. For example, digital sensors may collect telemetry data based on digital parameters, or analog sensors may collect analog telemetry data based on analog parameters (e.g., temperature levels, pressure levels, voltage levels, current levels), the analog telemetry data digitized by analog-digital converters (ADC) before reaching the microprocessor.

At a step 314, the microprocessor tabulates the additional sample sets of telemetry data. For example, the microprocessor may timestamp each element of telemetry data, and tabulate the dataset based on the timestamping (e.g., according to common timestamps).

At a step 316, the microprocessor generates one or more principal components based on the tabulated telemetry data according to the scalar parameters corresponding to the machine learning algorithms by which the compressed data will be evaluated.

At a step 318, the microprocessor generates data payloads based on the principal component sets and including unique identifiers corresponding to the relevant machine learning algorithms.

At the step 320, the data payloads are transmitted via real-time avionics networks. For example, the data payload may be transmitted to a ground-based control facility for analysis and evaluation, or transmitted to an onboard data concentrator for short-term storage.

Referring in particular to FIG. 3C, the method 300 may include additional steps 322 through 330. At the step 322, the aircraft sensors collect one or more additional sets of raw telemetry data.

At a step 324, the microprocessor determines a covariance matrix of the additional telemetry data.

At a step 326, the microprocessor determines eigenvalues of the determined covariance matrix (the eigenvalues corresponding to eigenvectors).

At a step 328, the microprocessor selects m top eigenvalues of the above-determined eigenvalues (where m is an integer) based on a desired variance level or predetermined threshold.

At the step 330, the microprocessor modifies one or more scalar parameters based on new eigenvectors corresponding to the selected m top eigenvalues.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A predictive maintenance system, comprising:
   one or more sensors disposed within an aircraft, each sensor configured to 1) monitor one or more parameters associated with the aircraft and 2) collect at least one sample set of telemetry data associated with the parameters;
   at least one memory configured for storing:
     one or more machine learning algorithms;
     at least one algorithm identifier corresponding to each machine learning algorithm; and
     a plurality of scalar parameters corresponding to each machine learning algorithm; and
   at least one microprocessor in communication with the memory and with the one or more sensors, the microprocessor configured to:
     generate at least one set of tabulated telemetry data based on the at least one sample set of telemetry data;
     generate at least one set of principal components corresponding to the sample set of tabular telemetry data according to at least one selected scalar parameter of the plurality of scalar parameters; and
     generate at least one data payload comprising 1) the set of principal components and 2) the at least one algorithm identifier corresponding to the at least one selected scalar parameter.

2. The predictive maintenance system of claim 1, wherein the one or more sensors include at least one digital sensor configured to collect digital telemetry data associated with one or more digital parameters.

3. The predictive maintenance system of claim 1, wherein the one or more sensors include:
   at least one analog sensor configured to collect analog telemetry data associated with one or more analog parameters; and
   at least one analog/digital converter (ADC) in communication with the at least one analog sensor and with the at least one microprocessor, the ADC configured to digitize the analog telemetry data.

4. The predictive maintenance system of claim 3, wherein the one or more analog parameters include at least one of a temperature, a voltage, and a current level.

5. The predictive maintenance system of claim 1, wherein the at least one microprocessor is configured to generate the at least one set of tabulated telemetry data by:
   timestamping each element of the at least one sample set of telemetry data; and
   tabulating each timestamped element of the at least one sample set of telemetry data.

6. The predictive maintenance system of claim 1, wherein:
   the system is embodied within a line replaceable unit (LRU) of the aircraft, the LRU further comprising:
     at least one internal memory in communication with the microprocessor, the internal memory configured for storage of one or more of the at least one set of principal components and the at least one data payload.

7. The predictive maintenance system of claim 1, further comprising:
at least one network interface in communication with the microprocessor, the network interface configured to transmit the at least one data payload via a real-time network of the aircraft to at least one of 1) a data concentrator disposed aboard the aircraft and 2) a control facility external to the aircraft.

8. The predictive maintenance system of claim 1, wherein the sample set of telemetry data is a first sample set, and wherein:
the one or more sensors are configured to collect at least one second sample set of telemetry data; and
the at least one microprocessor is configured to:
center the at least one second sample set of telemetry data;
determine at least one covariance matrix corresponding to the second sample set;
determine at least one eigenvalue of the covariance matrix, the eigenvalue corresponding to at least one eigenvector;
select one or more eigenvalues of the at least one determined eigenvalue based on a predetermined desired variance threshold, and
modify the at least one scalar parameter based on at least one eigenvector corresponding to the one or more selected eigenvalues.

9. A method for predictive maintenance, comprising:
collecting, via at least one aircraft sensor, at least one first sample set of telemetry data;
determining, via the at least one microprocessor, at least one covariance matrix associated with the first sample set of telemetry data;
determining, via the at least one microprocessor, at least one eigenvalue of the covariance matrix, the eigenvalue corresponding to at least one eigenvector;
selecting, via the at least one microprocessor, one or more eigenvalues of the at least one determined eigenvalue based on a predetermined desired variance threshold;
defining at least one scalar parameter based on at least one eigenvector corresponding to the one or more selected eigenvalues, the scalar parameter associated with a machine learning algorithm;
collecting at least one second sample set of telemetry data from the at least one aircraft sensor;
generating at least one set of tabulated telemetry data by tabulating the at least one second sample set of telemetry data via the at least one microprocessor;
generating one or more principal components corresponding to the at least one set of tabulated telemetry data via the at least one microprocessor according to the at least one scalar parameter;
generating one or more data payloads via the at least one microprocessor, each data packet comprising the one or more principal components and at least one identifier corresponding to the associated machine learning algorithm; and
transmitting the one or more data payloads via at least one real-time avionics network.

10. The method of claim 9, wherein determining, via the at least one microprocessor, at least one covariance matrix associated with the second sample set of telemetry data includes:
centering, via the at least one microprocessor, the at least one second sample set of telemetry data; and
determining at least one covariance matrix associated with the centered telemetry data.

11. The method of claim 9, wherein generating at least one set of tabulated telemetry data by tabulating the at least one second sample set of telemetry data via the at least one microprocessor includes:
timestamping the at least one second sample set of telemetry data via the at least one microprocessor; and
tabulating the at least one set of timestamped telemetry data via the at least one microprocessor.

12. The method of claim 9, wherein collecting at least one second sample set of telemetry data from the at least one aircraft sensor includes:
collecting at least one sample set of analog telemetry data from at least one analog aircraft sensor; and
digitizing the at least one sample set of analog telemetry data via one or more analog-digital converters (ADC) in communication with the at least one analog sensor.

13. The method of claim 9, wherein collecting at least one second sample set of telemetry data from the at least one aircraft sensor includes:
collecting at least one sample set of digital telemetry data from at least one digital aircraft sensor.

14. The method of claim 9, wherein transmitting the one or more data payloads via at least one real-time avionics network includes:
transmitting the one or more data payloads to at least one of a data concentrator aboard the aircraft and a ground control facility external to the aircraft.

15. The method of claim 9, wherein the at least one covariance matrix is a first covariance matrix, the eigenvalue is a first eigenvalue, and the eigenvector is a first eigenvector, further comprising:
collecting, via the at least one aircraft sensor, at least one third sample set of telemetry data;
determining, via the at least one microprocessor, at least one second covariance matrix associated with the third sample set of telemetry data;
determining, via the at least one microprocessor, at least one second eigenvalue of the second covariance matrix, the second eigenvalue corresponding to at least one second eigenvector;
selecting, via the at least one microprocessor, one or more second eigenvalues of the at least one determined second eigenvalue based on the predetermined desired variance threshold, and
modifying the at least one scalar parameter based on at least one second eigenvector corresponding to the one or more selected second eigenvalues.

* * * * *